(12) United States Patent
Sakaida

(10) Patent No.: US 7,027,667 B1
(45) Date of Patent: Apr. 11, 2006

(54) IMAGE CONVERSION METHOD AND APPARATUS, IMAGE CONVERSION PROCESSING PROGRAM, AND RECORDING MEDIUM ON WHICH IMAGE CONVERSION PROCESSING PROGRAM IS RECORDED

(75) Inventor: Hideyuki Sakaida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/397,920

(22) Filed: Sep. 17, 1999

(30) Foreign Application Priority Data

Sep. 18, 1998 (JP) .................................. 10-265498
Aug. 27, 1999 (JP) .................................. 11-241776

(51) Int. Cl.
*G06K 9/32* (2006.01)

(52) U.S. Cl. ...................................... 382/298; 382/300

(58) Field of Classification Search ................ 382/298, 382/299, 300, 276, 293; 358/451; 345/660, 345/663, 665, 667–671
See application file for complete search history.

(56) References Cited

U.S. PATENT DOCUMENTS

| 4,764,975 | A | * | 8/1988 | Inoue | 382/47 |
| 5,680,225 | A | * | 10/1997 | Hirabayashi et al. | 358/451 |
| 5,832,124 | A | * | 11/1998 | Sato et al. | 382/238 |
| 5,907,640 | A | * | 5/1999 | Delean | 382/276 |
| 6,252,989 | B1 | * | 6/2001 | Geisler et al. | 382/232 |

* cited by examiner

*Primary Examiner*—Yon J. Couso
(74) *Attorney, Agent, or Firm*—Birch, Stewart, Kolasch & Birch, LLP

(57) ABSTRACT

Image conversion to one-half of a number of pixels is carried out repeatedly to allow formation of an intermediate image having pixels of a number close to a set number of pixels. The intermediate image is further subjected to image conversion to thereby obtain image data of the set number of pixels.

22 Claims, 9 Drawing Sheets

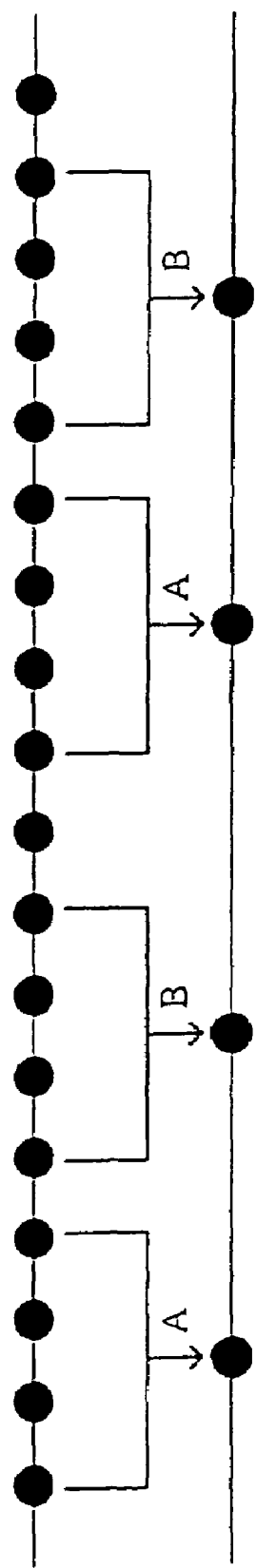

FIG. 8A

[IMAGE-SIZE m×n] →(MULTIPLICATION: $12^2 mn \cdot \frac{2}{9}$)→ [IMAGE-SIZE $\frac{2m}{9} \times \frac{2n}{9}$]

FIG. 8B

[IMAGE-SIZE m×n] →(MULTIPLICATION: $4^2\left(\frac{29}{45}\right)^2 mn \cdot \frac{29}{45}$)→ [IMAGE-SIZE $\frac{29m}{45} \times \frac{29n}{45}$] →(MULTIPLICATION: $4^2\left(\frac{17}{45}\right)^2 mn \cdot \frac{10}{17}$)→ [IMAGE-SIZE $\frac{17m}{45} \times \frac{17n}{45}$] →(MULTIPLICATION: $4^2 mn \cdot \frac{29}{45}$)→ [IMAGE-SIZE $\frac{2m}{9} \times \frac{2n}{9}$]

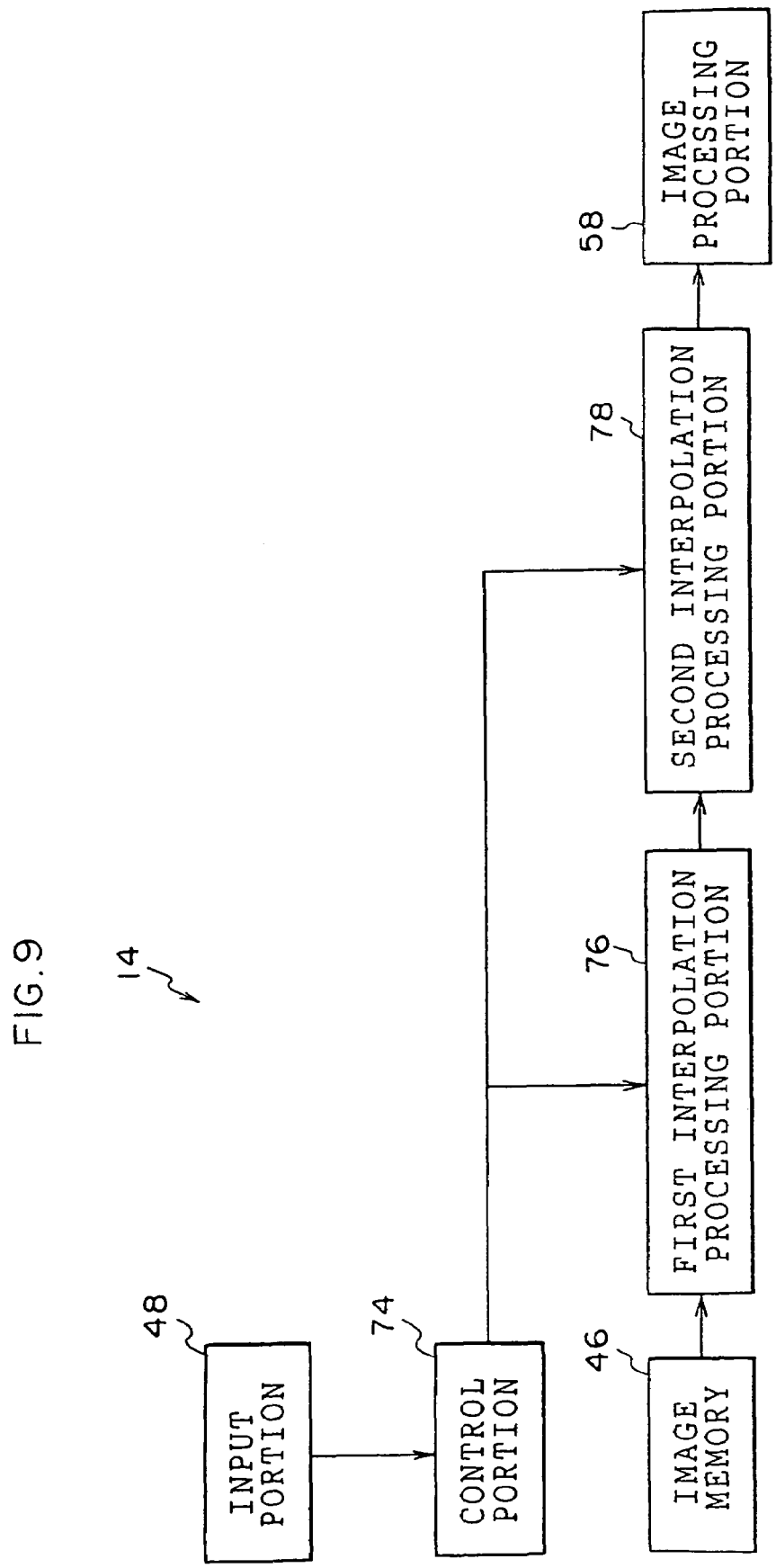

IMAGE CONVERSION METHOD AND APPARATUS, IMAGE CONVERSION PROCESSING PROGRAM, AND RECORDING MEDIUM ON WHICH IMAGE CONVERSION PROCESSING PROGRAM IS RECORDED

BACKGROUND OF THE INVENTION

1. Field of the Invention

The present invention relates to an image conversion apparatus having an interpolation function which is performed during image conversion in which, for example, an enlarged or reduced image is prepared from image data obtained by reading an original image by using a line CCD scanner or the like, and also relates to an image conversion method and a recording medium on which procedures of image conversion are recorded.

2. Description of the Related Art

There have conventionally been proposed various methods as an interpolation calculation method in which interpolation calculation for image data is performed. Generally, a method based on a cubic spline interpolation function is used often. In this method, original image data $\{Z_K\}$ obtained by reading an original image is linked together by a cubic function $\{f_K\}$ at each section, and a value of $f_K$ at a position where an interpolated point is set (that is, a set position in the above-described section) is determined as interpolated image data.

The interpolation calculation which interpolates image data of an original image is a method of interpolation having a relatively high sharpness. For example, a cubic spline interpolation calculation is known as such a method.

In the cubic spline interpolation calculation, image data of continuous pixels $X_{k-2}, X_{k-1}, X_k, X_{k+1}, X_{k+2}, \ldots$, which are obtained by digital reading, are indicated as $Z_{k-2}, Z_{k-1}, Z_k, Z_{k+1}, Z_{k+2}, \ldots$, respectively. Here, a spline interpolation function is set for each of sections, $X_{k-2}X_{k-1}, X_{k-1}X_k, X_kX_{k+1}$, and $X_{k+1}X_{k+2}$, and the spline interpolation functions corresponding to these sections are indicated as $f_{k-2}, f_{k-1}, f_k, f_{k+1}, f_{k+2}, \ldots$, respectively. Each interpolation function is a cubic function in which a position of the section is set as a variable.

Here, there will be described a case in which a point to be interpolated (hereinafter referred to as an interpolated point) is in a range of the section $X_kX_{k+1}$. The spline interpolation function corresponding to the section $X_kX_{k+1}$ is given by the following expression (1).

$$f_k(x) = A_k x^3 + B_k x^2 + C_k x + D_k \qquad (1)$$

$$f_k(X) = Z_k \qquad (2)$$

$$f_k(X_{k+1}) = Z_{k+1} \qquad (3)$$

$$f'_k(X_k) = f'_{k-1}(X_k) \qquad (4)$$

$$f'_k(X_{k+1}) = f'_{k+1}(X_{k+1}) \qquad (5)$$

In the aforementioned expressions, f' indicates a first-order differentiation of function f, i.e., $(3A_k x^2 + 2B_k x + C_k)$.

Strictly speaking, the cubic spline interpolation calculation also includes a condition of continuity of a second-order differential coefficient of function f, but if so, the computation formula becomes complicated. Accordingly, a simplified form of interpolation calculation such as that described above is generally used.

Further, in the cubic spline interpolation calculation, there is the condition that a first-order differential coefficient at a pixel $X_K$ coincides with the slope $(Z_{k+1} - Z_{k-1})/(X_{k+1} - X_{k-1})$ of image data $Z_{k-1}$ and $Z_{k+1}$ of the pixels $X_{k-1}$ and $X_{k+1}$, which pixels are the pixels before and after the pixel $X_k$. Accordingly, the following expression (6) must be established.

$$f'_k(X_k) = (Z_{k+1} - Z_{k-1})/(X_{k+1} - X_{k-1}) \qquad (6)$$

Similarly, in the cubic spline interpolation calculation, there is the condition that a first-order differential coefficient at a pixel $X_{K+1}$ coincides with the slope $(Z_{k+2} - Z_k)/(X_{k+2} - X_k)$ of image data $Z_k$ and $Z_{k+2}$ of the pixels $X_k$ and $X_{k+2}$, which are the pixels before and after the pixel $X_{k+1}$. Accordingly, the following expression (7) must be established.

$$f'_k(X_{k+1}) = (Z_{k+2} - Z_k)/(X_{k+2} - X_k) \qquad (7)$$

Here, assuming that an interval (that is, a grid interval) of each of the sections, $X_{k-2}X_{k-1}, X_{k-1}X_k, X_kX_{k+1}$, and $X_{k+1}X_{k+2}$, is set to be 1 and a position of an interpolated point $X_p$ from the pixel $X_k$ to the pixel $X_{k+1}$ is indicated as $t$ ($0 \leq t \leq 1$), the following expressions are derived from the expressions (1) to (7).

$$f_k(0) = D_k = Z_k$$

$$f_k(1) = A_k + B_k + C_k + D_k = Z_{k+1}$$

$$f'_k(0) = C_k = (Z_{k+1} - Z_{k-1})/2$$

$$f'_k(1) = 3A_k + 2B_k + C_k = (Z_{k+2} - Z_k)/2$$

Accordingly, $A_k$, $B_k$, $C_k$, and $D_k$ are expressed as described below.

$$A_k = (Z_{k+2} - 3Z_{k+1} + 3Z_k - Z_{k-1})/2$$

$$B_k = (-Z_{k+2} + 4Z_{k+1} - 5Z_k + 2Z_{k-1})/2$$

$$C_k = (Z_{k+1} - Z_{k-1})/2$$

$$D_k = Z_k$$

The spline interpolation function $f_k(x)$ makes a change of variable of $X = t$ as described above, and therefore, the following relation is established:

$$f_k(X) = f_k(t)$$

Accordingly, interpolated image data $Z_p$ at the interpolated point $X_p$ is as follows:

$$Z_p = f_k(t) = A_k t^3 + B_k t^2 + C_k t + D_k \qquad (8)$$

$$Z_p = ((-t^3 + 2t^2 - t)/2)Z_{k-1} + ((3t^3 - 5t^2 + 2)/2)Z_k + ((-3t^3 + 4t^2 + t)/2)Z_{k+1} + ((t^3 - t^2)/2)Z_{k+2} \qquad (9)$$

Respective coefficients of original image data $Z_{k-1}$, $Z_k$, and $Z_{k+1}$ are referred to as interpolation coefficients $c_{k-1}(t)$, $c_k(t)$, $c_{k+1}(t)$, and $c_{k+2}(t)$, respectively. Namely, the interpolation coefficients $c_{k-1}(t)$, $c_k(t)$, $c_{k+1}(t)$, and $c_{k+2}(t)$ corresponding to the original image data $Z_{k-1}$, $Z_k$, and $Z_{k+1}$ in expression (9) are as follows.

$$c_{k-1}(t) = (-t^3 + 2t^2 - t)/2$$

$$c_k(t) = (3t^3 - 5t^2 + 2)/2$$

$$c_{k+1}(t) = (-3t^3 + 4t^2 + t)/2$$

$$c_{k+2}(t) = (t^3 - t^2)/2$$

By repeating the above-described calculations for each of the sections $X_kX_{k-1}, X_{k-1}X_k, X_kX_{k+1}$, and $X_{k+1}X_{k+2}$, interpolated image data whose intervals are different from those of the original image data can be obtained for the whole of the original image data.

In other words, as can be seen from expression (9), the cubic spline interpolation calculation allows calculation of an interpolated point by weighted averaging of the peripheral four points.

However, when interpolation is carried out by weighted averaging of the pixel values of an original image as described above, use of many pixels of an original image for the weighted averaging is contemplated so as to improve the image quality. In this case, a corresponding amount of calculation processing time for this operation is inevitably required.

SUMMARY OF THE INVENTION

In view of the aforementioned, it is an object of the present invention to improve calculation processing efficiency during image conversion and further improve the image quality of an image after image conversion.

A first aspect of a first invention is an image conversion method in which image data represented by a required number of pixels is obtained from original image data represented by a predetermined number of pixels, comprising the steps of: carrying out image conversion by obtaining, by interpolation calculation, image data represented by a number of pixels which is one-half of the predetermined number of pixels, from the original image data represented by the predetermined number of pixels; preparing an intermediate image by repeatedly carrying out image conversion at a rate of one-half of the number of pixels, until a number of pixels close to the required number is reached; and carrying out image conversion by obtaining, from the intermediate image, image data represented by the required number of pixels. Namely, an image conversion method in which image data represented by a required number of pixels is obtained from original image data represented by a predetermined number of pixels, comprises the steps of: repeatedly carrying out image conversion which obtains, by interpolation calculation and from initial image data, subsequent image data represented by a number of pixels which is one-half of the number of pixels of the initial image data, the image conversion being repeatedly carried out from the original image data until the number of pixels of image data obtained by the image conversion is near the required number of pixels; and obtaining, from image data of the number of pixels near the required number of pixels, image data represented by the required number of pixels.

According to the first aspect, in the image conversion method in which image data represented by a required number of pixels is obtained from original image data represented by a predetermined number of pixels, image conversion (for example, cubic spline interpolation calculation) is carried out by obtaining, by interpolation calculation, image data represented by a number of pixels which is one-half of the predetermined number of pixels of the original image data, from the original image data represented by the predetermined number of pixels. Further, by repeatedly carrying out the image conversion to one-half of the number of pixels until a required number of pixels is reached, an intermediate image is prepared. Image conversion is carried out by interpolation calculation, such as cubic spline interpolation calculation, from the prepared intermediate image to an image having the required number of pixels. An image conversion method in which image data represented by a required number of pixels is obtained from original image data represented by a predetermined number of pixels, comprises the steps of: repeatedly carrying out image conversion which obtains, by interpolation calculation and from initial image data, subsequent image (an intermediate image) data represented by a number of pixels which is one-half of the number of pixels of the initial image data, the image conversion being repeatedly carried out from the original image data until the number of pixels of image data obtained by the image conversion is near the required number of pixels, the subsequent image data obtained at one time of the image conversion being used as the initial image data in the next image conversion; and obtaining, from image (final intermediate image) data of the number of pixels near the required number of pixels, image data represented by the required number of pixels. As a result, an image having the required number of pixels can be obtained.

As described above, when an intermediate image is prepared, interpolation which reflects a larger number of peripheral pixels can be effected by repeatedly carrying out the image conversion to one-half of the number of pixels. Further, the above-described image conversion is simple conversion to one-half of the number of pixels, and therefore, a great amount of calculation processing time is not required. As a result, the calculation processing efficiency can be improved. Namely, the image quality of an image subjected to image conversion can be improved without requiring much calculation time.

A second aspect of the present invention is characterized in that interpolation calculation, which is carried out when the image conversion for preparing the intermediate image is effected, is different from interpolation calculation, which is carried out when the image conversion for obtaining the image data represented by the required number of pixels from the intermediate image is effected.

According to the second aspect, when the intermediate image is prepared, for example, as long as the intermediate image is obtained by an interpolation method (hereinafter referred to as cubic spline interpolation calculation with pixels displaced) in which image data, which is uniformly displaced at a predetermined variation ratio in an interpolation curve generated for continuously representing original image data and which is represented by a number of pixels which is one-half of the number of pixels of the original image data, is obtained by interpolation calculation, deterioration of image quality caused by the image conversion to one-half of the number of pixels can be lessened. Further, the image conversion from the prepared intermediate image may be carried out such that image data represented by a required number of pixels is obtained by using ordinary interpolation calculation such as cubic spline interpolation calculation.

A third aspect of the present invention is characterized in that the intermediate image has a number of pixels which is greater than and closest to the required number of pixels.

According to the third aspect, by making the number of pixels of the intermediate image obtained from original image data by repeatedly carrying out image conversion at a rate of one-half of the number of pixels, larger than and close to a required number of pixels, in the interpolation processing of image conversion to the required number of pixels which is subsequently carried out, the image quality can be improved as compared with a case in which the intermediate image is made to have a number of pixels which is less than the required number of pixels.

A fourth aspect of the present invention is characterized in that the intermediate image is prepared by dividing the original image data into partial images and repeatedly carrying out the image conversion to one-half of the number of pixels for each of the partial images.

According to the fourth aspect, when an intermediate image, which is to be obtained by repeatedly carrying out image conversion to a one-half of the number of pixels, is to be generated, the original image data is divided into partial images and the image conversion to one-half of the number of pixels is repeatedly carried out for each of the divided partial images. Subsequently, the image conversion to one-half of the number of pixels is similarly carried out sequentially for the other partial images. By preparing the intermediate image in this way, the amount of memory required when the intermediate image is prepared can be reduced.

A fifth aspect of the present invention is characterized in that the interpolation calculation is carried out by using at least two types of interpolation calculation methods.

According to the fifth aspect, as the interpolation calculation, there can be employed two or more types of interpolation methods such as linear interpolation and cubic spline interpolation. Further, by carrying out in combination interpolation calculation in which importance is given to a processing speed and interpolation calculation in which importance is set on image quality, both a high processing speed (calculation speed) and good image quality can be achieved.

For example, among the interpolation calculations to one-half of the number of pixels which are carried out plural times, linear interpolation in which importance is set on processing speed may be carried out as an earlier interpolation calculation, and cubic spline interpolation in which importance is set on image quality may be carried out as a later interpolation calculation, thereby resulting in both a high processing speed and good image quality.

A second invention is an image conversion method in which image data represented by a required number of pixels is obtained from original image data represented by a predetermined number of pixels by repeatedly carrying out interpolation calculation at a rate of one-half of the number of pixels, wherein image data represented by the required number of pixels is obtained by carrying out interpolation calculation at a rate of x (wherein 1>x>1/2) of a number of pixels at one of a beginning step, an intermediate step, and a final step of image conversion.

According to the second invention, when the required number of pixels is different from $1/2^n$ (wherein, n is a natural number), interpolation calculation at a rate of x is carried out at any one of an initial stage, an intermediate stage, and a final stage of the repeated interpolation calculations to one-half of the number of pixels so as to allow image conversion to the required number of pixels. For example, when the required number of pixels is different from $1/2^n$ (wherein, n is a natural number), interpolation calculation at a rate of x becomes necessary in addition to the repeated interpolation calculations at a rate of one-half. By carrying out the interpolation calculation at a rate of x at any one of initial, intermediate, or final stage of the repeated interpolation calculations to one-half, conversion to image data represented by the required number of pixels can be effected.

A first aspect of a third invention is an image conversion method in which image data represented by a required number of pixels is obtained from original image data represented by a predetermined number of pixels, comprising the steps of: obtaining by interpolation calculation, from the original image data represented by the predetermined number of pixels, image data represented by a number of pixels of 1/N (wherein N is an integer of 2 or more) or greater, by using an N-size filter used to obtain an interpolated point from N pixels, thereby allowing image conversion; and obtaining image data represented by the required number of pixels by carrying out the interpolation calculation plural times.

According to the first aspect of the third invention, conversion of a number of pixels to 1/a means interpolation with an interpolated point being determined for each a pixels of an original image. Namely, when image conversion is effected to reduce the number of pixels by using an N-size filter for obtaining an interpolated point from N pixels, image data of pixels before the conversion can be reflected in the image data after the conversion by effecting the conversion at a rate of 1/N or greater. Accordingly, by repeatedly carrying out the interpolation calculation at a rate of 1/N or greater so as to obtain image data represented by the required number of pixels, the image quality of an image after image conversion can be improved.

Further, when the image conversion is effected by using an N-size filter, multiplication must be carried out $N^2$ times. Accordingly, in the first aspect, by repeatedly carrying out conversion at a rate of 1/N or greater to allow conversion to image data represented by the required number of pixels, the number of times multiplication is carried out can be reduced. For example, a case in which an image having an image size of m (pixels)×n (pixels) is converted at the rate of 2/9 by carrying out image conversion three times (for example, three image conversions at rates of 29/45, 17/29, and 10/17) by using a 4×4 size filter and a case in which the image is converted at a single time at the rate of 2/9 by using a 12×12 size filter may be compared with each other. In the former case, the image conversion can be effected by carrying out multiplication 25 mn times ($=\{4^2+4^2(29/45)^2+4^2(17/45)^2\}$mn), and in the latter case, the image conversion can be effected by carrying out multiplication 144 ($=12^2$) times. Namely, due to the image conversion at a rate of 1/N or greater being effected plural times to thereby allow conversion to image data represented by the required number of pixels, the calculation time can be shortened.

Accordingly, the calculation processing efficiency during the image conversion can be improved and image quality after the image conversion can be improved as compared with a conventional system.

A second aspect of the third invention is characterized in that the required number of pixels is 1/N (wherein N is an integer of 2 or more) or less.

According to the second aspect, when the required number of pixels is 1/N or less, repetition of interpolation calculation at a rate of 1/N or greater is made possible.

A third aspect of the third invention is characterized in that the interpolation calculations carried out plural times are effected in order from that of the lowest conversion rate.

According to the third aspect, when the image conversion is repeated plural times to thereby allow conversion to the required number of pixels, a larger number of pixels of the original image are reflected in one of pixels after an image conversion carried out later as compared with a case of one of pixels after an image conversion carried out earlier. Accordingly, by effecting the interpolation calculations in order from that of a low conversion rate, deterioration in image quality caused by image conversions carried out later can be prevented.

A fourth aspect of the third invention is characterized in that the interpolation calculation is carried out by using at least two types of interpolation calculation methods.

According to the fourth aspect, as the interpolation calculation carried out plural times, there can be used two or more types of interpolation methods such as linear interpolation or cubic spline interpolation or the like. Further, by carrying out a combination of interpolation calculation in which importance is set on processing speed and interpolation calculation in which importance is set on image quality, both a high processing speed (calculation speed) and good image quality can be achieved.

For example, among the interpolation calculations carried out plural times, linear interpolation, in which importance is set on the processing speed, may be carried out as an early interpolation calculation, and cubic spline interpolation, in which importance is set on image quality, may be carried out as a later interpolation calculation, thereby resulting in both high processing speed and good image quality.

A fourth invention is an image conversion apparatus comprising: setting means for setting a number of pixels after image conversion of original image data represented by a predetermined number of pixels; interpolation calculation means which effects image conversion by obtaining, by interpolation calculation, image data represented by pixels of the number set by the setting means; and control means which controls the interpolation calculation means such that the interpolation calculation means converts the original image data into an intermediate image having a number of pixels close to the number of pixels set by the setting means by repeatedly effecting the image conversion to one-half and such that the interpolation calculation means carries out image conversion to further make the intermediate image into the set number of pixels.

According to the fourth invention, the number of pixels after image conversion of original image data represented by a predetermined number of pixels is set by the setting means. The interpolation calculation means carries out image conversion by carrying out interpolation calculation repeatedly to obtain image data represented by a desired number of pixels. The control means effects control such that the interpolation calculation means repeatedly effects image conversion to one-half of the number of pixels so as to generate an intermediate image having a number of pixels which is close to the number of pixels set by the setting means. Further, the interpolation calculation means carries out further interpolation calculation to thereby allow image conversion from the generated intermediate image to an image having the number of pixels set by the setting means, and an interpolated image having the number of pixels set by the setting means can be obtained. The intermediate image is prepared by repetition of image conversion to one-half of the number of pixels, and therefore, interpolation in which a large number of peripheral pixels of the original image data is reflected is carried out, and the image quality can thereby be improved. Further, the image conversion to one-half of the number of pixels can be effected by a simple calculation, and a large amount of calculation time is not required. As a result, the calculation processing efficiency can be improved.

Namely, the image quality of an image subjected to the image conversion can be improved without requiring much calculation time.

A fifth invention is an image conversion apparatus comprising: setting means for setting a number of pixels after image conversion of original image data represented by a predetermined number of pixels; first interpolation calculation means which effects image conversion by obtaining, by interpolation calculation and from the original image data represented by the predetermined number of pixels, image data represented by pixels of a number which is one-half of the predetermined number of pixels, and prepares an intermediate image by repeatedly effecting the image conversion at a rate of one-half until a number of pixels close to the required number of pixels is reached; and second interpolation calculation means which effects interpolation calculation such that the intermediate image is further made into image data represented by pixels of the number set by the setting means.

According to the fifth invention, the number of pixels after image conversion of original image data represented by a predetermined number of pixels is set by the setting means. The first interpolation calculation means effects image conversion by obtaining, by interpolation calculation, image data represented by a number of pixels which is one-half of the predetermined number of pixels, and generates an intermediate image by repeatedly carrying out image conversion to one-half of the number of pixels until a number of pixels close to the required number is obtained. In the interpolation method when the intermediate image is prepared, by carrying out image conversion by interpolation calculation such as the above-described cubic spline interpolation calculation with pixels being displaced, deterioration in image quality can be reduced. The intermediate image thus prepared is converted by the second interpolation calculation means to the number of pixels set in the setting means. As the interpolation method used at this time, an ordinary interpolation method such as cubic spline interpolation calculation may be carried out so as to obtain an image having the number of pixels set in the setting means. The intermediate image is thus prepared by the first interpolation calculation means repeatedly carrying out image conversion to one-half of the number of pixels. Therefore, interpolation in which a large number of peripheral pixels in the original image data is reflected is carried out, and the image quality can thereby be improved. Further, the image conversion to one-half of the number of pixels can be effected by a simple calculation and a large amount of calculation time is not required. Accordingly, the calculation processing efficiency can be improved.

Namely, the image quality of an image which has been subjected to the image conversion can be improved without requiring a lot of calculation time.

A sixth invention is characterized by comprising: setting means for setting a number of pixels after image conversion of original image data represented by a predetermined number of pixels; interpolation calculation means which effects interpolation calculation at a rate of 1/N (wherein N is an integer of 2 or more) or greater by using an N-size filter used for obtaining an interpolated point from N pixels; and control means which controls the interpolation calculation means so that image data represented by pixels of the number set by the setting means is obtained by effecting the interpolation calculation plural times.

According to the sixth invention, conversion of the number of pixels at a rate of 1/a means interpolation with an interpolated point being determined for each a pixels of the original image. Namely, when image conversion is effected to reduce the number of pixels by using an N-size filter for obtaining an interpolated point from pixels, image data of pixels before the conversion can be reflected in image data after the conversion by effecting the conversion at a rate off 1/N or greater. Accordingly, in the sixth invention, the number of pixels, which is to be obtained by image conversion of the original image data represented by the predetermined number of pixels, is set by the setting means, and the image data represented by the number of pixels set by the setting means is obtained by the interpolation calculation means carrying out plural interpolation calculations at a rate of 1/N or greater using an N-size filter. The control means divides the conversion rate so as to obtain the set number of pixels, and controls the interpolation calculation means to carry out interpolation calculation at the respective divisional conversion rates such that interpolation calculation is carried out plural times to convert to image data having a required number of pixels. Namely, by repeating the conversion at a rate of 1/N or greater to obtain image data represented by the required number of pixels, the image quality of the image after image conversion can be improved.

Further, when the image conversion is effected by using an N-size filter, multiplication must be carried out $N^2$ times. Accordingly, in the sixth invention, due to the control means controlling the interpolation calculation means to repeatedly carry out conversion at a rate of 1/N or greater to allow conversion to image data represented by the required number of pixels, the number of times multiplication must be carried out can be reduced. For example, let us compare a case in which an image having an image size of m (pixels)×n (pixels) is converted at the rate of 2/9 by carrying out image conversion three times (for example, three image conversions at the rates of 29/45, 17/29, and 10/17) by using a 4×4 size filter, and a case in which the image is converted at the rate of 2/9 by using a 12×12 size filter. In the former case, the image conversion can be effected by carrying out multiplication 25 mn times $(=\{4^2+4^2(29/45)^2+4^2(17/45)^2\}mn)$, and in the latter case, the image conversion can be effected by carrying out multiplication 144 (=122) times. Namely, due to the image conversion at a rate of 1/N or greater being effected plural times to thereby allow conversion to image data represented by the required number of pixels, the calculation time can be shortened.

Accordingly, the calculation processing efficiency during the image conversion can be improved, and the image quality after the image conversion is improved over that of a conventional system.

A seventh invention is an image conversion processing program which allows image conversion processing, for converting original image data represented by a predetermined number of pixels to image data representing an image by a set number of pixels, to be executed by a computer, comprising: a first step in which image conversion is effected by obtaining, by interpolation calculation, image data represented by pixels of a number which is one-half of the predetermined number of pixels from the original image data represented by the predetermined number of pixels, and an intermediate image is prepared by repeatedly effecting the image conversion to one-half until a number of pixels close to a required number of pixels is reached; and a second step in which the image conversion is effected by obtaining image data represented by a required number of pixels from the intermediate image prepared in the first step.

According to the seventh invention, in a first step, interpolation calculation, in which image data represented by a number of pixels which is one-half of the number of pixels of the original image data is obtained from the original image data which represents an image by a predetermined number of pixels, is carried out, and the image conversion to one-half of the number of pixels is repeated until a number of pixels close to the required number of pixels is reached, so as to prepare the intermediate image. In the intermediate image thus prepared, interpolation in which a large number of peripheral pixels of the original image data are reflected can be carried out, and the image quality can thereby be improved. Further, this processing is a simple image conversion to one-half of the number of pixels, and therefore, the calculation processing efficiency can be improved. Subsequently, in the second step, image data represented by a number of pixels which is set from the prepared intermediate image can be obtained. By effecting image conversion based on such a procedure, the calculation processing efficiency can be improved, and image quality can be improved over a case in which image data obtained by ordinary interpolation is used.

Further, a deterioration in image quality can be lessened if image conversion is carried out by using an interpolation method, such as the above-described cubic spline interpolation with pixels displaced, as the interpolation method used at the time of preparing the intermediate image in the first step.

An eighth invention is an image conversion processing program which allows image conversion processing, for converting original image data represented by a predetermined number of pixels to image data representing an image by a set number of pixels, to be executed by a computer, comprising: a first step in which image data, which is represented by a number of pixels which is reduced to 1/N (wherein N is an integer of 2 or more) of the predetermined number of pixels, is obtained by interpolation calculation from original image data represented by the predetermined number of pixels, by using an N-size filter used for obtaining an interpolated point from N pixels; and a second step in which image data represented by a required number of pixels is obtained by carrying out the first step plural times.

According to the eighth invention, conversion of the number of pixels to 1/a means interpolation with an interpolated point being determined for each of a pixels of an original image. Namely, when image conversion is effected to reduce the number of pixels by using an N-size filter for obtaining an interpolated point from N pixels, image data of pixels before the conversion can be reflected in the image data after the conversion by effecting the conversion to 1/N or greater. Accordingly, in the present eighth invention, in the first step, image data represented by a number of pixels reduced to 1/N or greater by using an N-size filter is obtained by interpolation calculation from original image data represented by the predetermined number of pixels. Subsequently, in the second step, by obtaining image data represented by the required number of pixels by effecting the first step plural times, the image quality after the image conversion can be improved.

Further, when the image conversion is effected by using an N-size filter, multiplication must be carried out $N^2$ times. Accordingly, in the present eighth invention, by repeatedly carrying out conversion at a rate of 1/N or greater plural times in the first and second steps to allow conversion to image data represented by the required number of pixels, the number of times multiplication must be carried out can be reduced. For example, let us compare a case in which an image having an image size of m (pixels)×n (pixels) is converted at the rate of 2/9 by carrying out image conversion three times (for example, three image conversions at the rates of 29/45, 17/29, and 10/17) by using a 4×4 size filter, and a case in which the image is converted at the rate of 2/9 by using a 12×12 size filter. In the former case, the image conversion can be effected by carrying out multiplication 25 mn times $(=\{4^2+4^2(29/45)^2+4^2(17/45)^2\}mn)$, and in the latter case, the image conversion can be effected by carrying out multiplication 144 (=$12^2$) times. Namely, due to the image conversion at a rate of 1/N or greater being effected plural times to thereby allow conversion to image data represented by the required number of pixels, the calculation time can be shortened.

Accordingly, the calculation processing efficiency during the image conversion can be improved, and the image quality after the image conversion can be improved over that obtained with a conventional system.

BRIEF DESCRIPTION OF THE DRAWINGS

FIG. 7 is a diagram for illustrating image conversion carried out using a 4×4 size filter.

FIG. 8A is a diagram for illustrating the number of times multiplication is carried out when image conversion is carried out by using a 12×12 size filter, and FIG. 8B is a diagram for illustrating the number of times multiplication is carried out when three-stage image conversion is carried out by using a 4×4 size filter.

FIG. 9 is a block diagram which shows the structure of an image conversion section according to a third embodiment of the present invention.

DESCRIPTION OF THE PREFERRED EMBODIMENTS

Referring now to the attached drawings, an example of an embodiment of the present invention will be described hereinafter in detail.

First Embodiment

Figure 1:
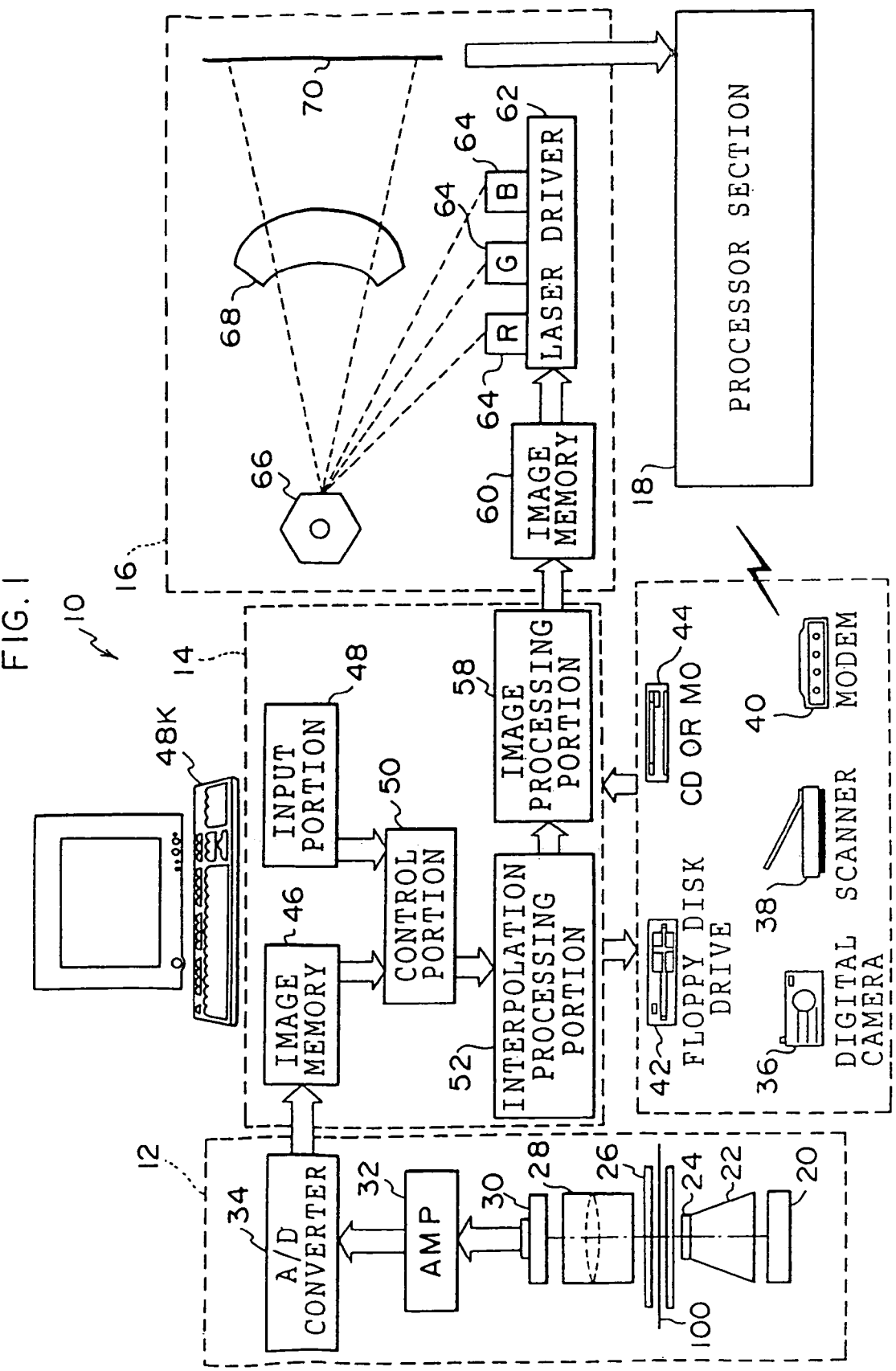
FIG. 1 is a schematic structural diagram of a digital laboratory system according to an embodiment of the present invention.

FIG. 1 schematically shows the structure of a digital laboratory system 10 according to the embodiment of the present invention.

As shown in FIG. 1, the digital laboratory system 10 is formed by an image input section 12, an image conversion section 14, a laser printer section 16, and a processor section 18.

The image input section 12 is used to read frame images recorded on a photographic film such as a negative film or a reversal film. Examples of the photographic film on which frame images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The image input section 12 reads the frame images to be read by a line CCD 30, amplifies image signals corresponding to the frame images by an amplifier (AMP) 32, and effects analog-to-digital (A/D) conversion by an analog-to-digital (A/D) converter 34, and thereafter, outputs image data to the image conversion section 14.

In the present embodiment, description is given of the digital laboratory system 10 in a case in which a photosensitive material such as a photographic film in a 135 magazine (hereinafter referred to simply as a photographic film) is applied thereto.

The image input section 12 is constructed in such a manner that a light source portion 20, an acrylic block 22 serving as a light guiding member by which light irradiated on a photographic film 100 is made into diffused light, and a light diffusion plate 24 are arranged in that order.

The photographic film 100 is conveyed by a film carrier 26, which is disposed at the side of the acrylic block 22 from which light is emitted (that is, the side at which the light diffusion plate 24 is disposed), such that the image surface of a frame image on the photographic film 100 is perpendicular to the optical axis. Further, a lens unit 28 which forms an image from light transmitted through a frame image, and a line CCD 30 are sequentially disposed along the optical axis at the side of the photographic film 100 opposite to the side at which the light source portion 20 is disposed. The lens unit 28 is shown as a single lens in FIG. 1, but is actually formed as a zoom lens comprised of a plurality of lenses.

In the line CCD 30, three sensing portions, each including a plurality of CCD cells arranged in a row along the transverse direction of the photographic film 100 being conveyed and further including an electronic shutter mechanism, are provided in parallel at intervals to form three lines, and color separation filters of red (R), green (G), and blue (B) are mounted at light incident sides of the three sensing portions (a so-called three-line color CCD). The line CCD 30 is disposed in such a manner that a light receiving surface of each sensing portion coincides with a position of an imaging point of the lens unit 28.

A transfer portion is provided in the vicinity of each sensing portion so as to correspond to the sensing portion. Electric charge accumulated in the CCD cells in each sensing portion is sequentially transmitted via the corresponding transfer portion.

The image conversion section 14 is structured such that image data (scan image data) outputted from the image input section 12 is inputted thereto. Examples of image data which can be inputted to the image conversion section 14 from the exterior include image data obtained by photographing using a digital camera 36 or the like, image data obtained by reading an original (for example, a reflection original) by a scanner 38 (of a flat-bed type), image data generated by a different computer and recorded in a floppy disk drive 42 or an MO (or CD) drive 44, communication image data received via a modem 40, and the like (these image data will be generically referred to as file image data).

The image conversion section 14 is formed by an input portion 48 including a keyboard 48K used to input a set value of the number of pixels, an interpolation processing portion 52 in which conversion of the number of pixels is effected by carrying out cubic spline calculation, a control portion 50 which effects control of the interpolation processing portion 52, and an image processing portion 58 in which various image processings (color gradation processing, hypertone processing, hypersharpness processing, and the like) are carried out on image data subjected to image conversion by the interpolation processing portion 52.

In the image conversion section 14, by controlling the interpolation processing portion 52 by the control portion 50 in accordance with a set value of the number of pixels inputted via the keyboard 48K of the input portion 48, a frame image recorded on the photographic film 100 is converted to a final intermediate image whose number of pixels is close to the set value of the number of pixels, by repeatedly carrying out image conversion which halves a number of pixels of an intermediate image, starting with the frame image. Subsequently, image conversion from the final intermediate image having a number of pixels close to the set number of pixels to an image having the set number of pixels is carried out. In the image conversion carried out when the intermediate image is prepared, only interpolation calculation which allows conversion to one-half of the number of pixels one-half is a simple ratio is carried out, and therefore, the calculation processing time can be reduced.

Further, the thus-prepared final intermediate image which has a number of pixels close to the set value is finally subjected to image conversion by control of the control portion 50 to thereby form an image having the set number of pixels in the interpolation processing portion 52. Interpolated image data finally obtained by the image conversion in the interpolation processing portion 52 is further subjected to various image processings in the image processing portion 58 and is outputted, as recording image data, to an image memory 58 of the laser printer section 16. When the intermediate images are prepared by repeatedly carrying out image conversion to one-half of the number of pixels, in a case in which the number of pixels before image conversion is 2N+1 (an odd number), the number of pixels after image conversion may be either N or N+1.

The image conversion section 14 can also output, as an image file, image data which has been subjected to the image conversion such as interpolation processing and further subjected to image processing, to the exterior thereof (for example, can output the image data to a storage medium such as an FD, MO, or CD, or transmit the image data to another information processing equipment via a communication line).

The laser printer section 16 includes laser light sources 64 of R, G, and B. The laser printer section 16 controls a laser driver 62 to cause modulated laser light to be irradiated on a photographic printing paper in accordance with recording image data inputted from the image conversion section 14 (which is temporarily stored in the image memory 60), and records an image on a photographic printing paper 70 by scan exposure (in the present embodiment, by an optical system mainly comprised of a polygon mirror 66 and an fθ lens 68). The processor section 18 carried out various processings including color development, bleach-fixing, washing, and drying on the photographic printing paper 70 on which the image was recorded by scan exposure in the laser printer section 16.

Next, with reference to FIGS. 2A and 2B, a description will be given of interpolation processing carried out in the interpolation processing portion 52 by the control of the control portion 50.

Figure 2A:
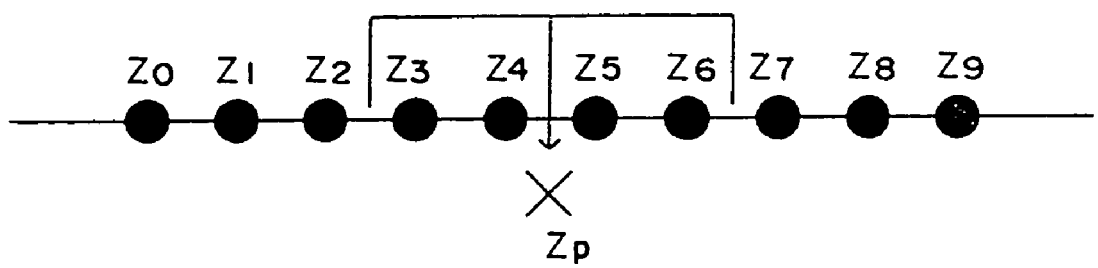
FIGS. 2A and 2B are diagrams which each show an interpolation method when an intermediate image is prepared in the embodiment of the present invention.

FIG. 2A shows a case in which an interpolated value $Z_p$ at an arbitrary point of the image whose number of pixels is one-fourth of the original frame image is obtained by a cubic spline interpolation calculation. FIG. 2B shows a case in which an interpolation value $Z_p$ at an arbitrary point of the image whose number of pixels is one-fourth of the original frame image is obtained (that is, an interpolated value of an intermediate image prepared in the interpolation processing portion 52 by the control of the control portion 50) by repeatedly carrying out image conversion to one-half of the number of pixels by the cubic spline interpolation calculation.

As shown in FIG. 2A, when the interpolated value $Z_p$ at an arbitrary point of the image whose number of pixels is one-fourth of the original frame image is obtained by the cubic spline interpolation calculation, the obtained interpolated value $Z_p$ reflects only image data of the four peripheral pixels of the original image data. As a result, the image quality deteriorates. On the other hand, in FIG. 2B, there is illustrated a case in which an intermediate image is prepared by repeatedly carrying out image conversion to one-half of the number of pixels and the intermediate image which has a number of pixels close to the set number of pixels is finally converted to an image having the set number of pixels. This case will be described hereinafter.

In the cubic spline interpolation calculation, when interpolation calculation of one-half of the number of pixels is carried out, an interpolation coefficient becomes a fixed coefficient and the interpolated value $Z_p$ to be obtained is represented by the following expression (10).

$$Z_p = BZ_0 + AZ_1 + AZ_2 + BZ_3 \tag{10}$$

wherein: $Z_0$, $Z_1$, $Z_2$, $Z_3$ indicate pixel data of the four peripheral points in the original image data, respectively; A indicates an interpolation coefficient (in actuality, A=0.5625); and B indicates an interpolation coefficient (in actuality, B=−0.0625).

The interpolation calculation is thus carried out by the simple calculation of the weighted averaging and by using fixed interpolation coefficients, and therefore, the efficiency of the calculation processing time can be improved.

Figure 2B:
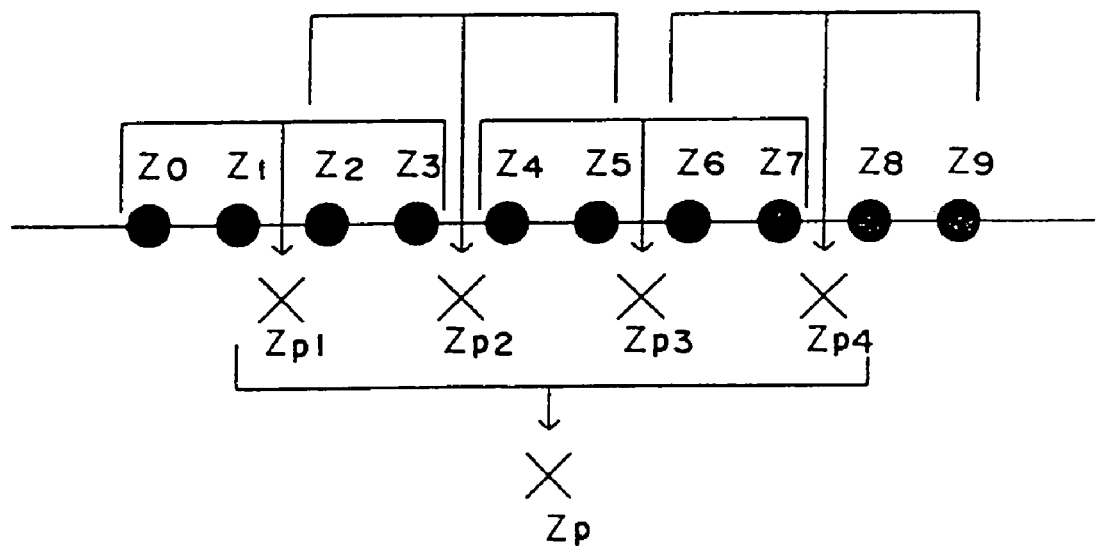

Further, when interpolated values $Z_{P1}$, $Z_{P2}$, $Z_{P3}$, and $Z_{P4}$ shown in FIG. 2B are obtained, these values are represented by the following expressions (12) to (15) employing the expression (10).

$$Z_{p1} = BZ_0 + AZ_1 + AZ_2 + BZ_3 \tag{12}$$

$$Z_{p2} = BZ_2 + AZ_3 + AZ_4 + BZ_5 \tag{13}$$

$$Z_{p3} = BZ_4 + AZ_5 + AZ_6 + BZ_7 \tag{14}$$

$$Z_{p4} = BZ_6 + AZ_7 + AZ_8 + BZ_9 \tag{15}$$

wherein: $Z_0$ to $Z_9$ are pixel values; A indicates an interpolation coefficient (in actuality, A=0.5625); and B indicates an interpolation coefficient (in actuality, B=−0.0625). As a result, the interpolated value $Z_p$ to be obtained is represented by the following expression.

$$Z_p = B^2 Z_0 + ABZ_1 + 2ABZ_2 + (A^2 + B^2)Z_3 + (A^2 + AB)Z_4 + (A^2 + AB)Z_5 + (A^2 + B^2)Z_6 + 2ABZ_7 + ABZ_8 + B^2 Z_9 \tag{16}$$

As can be seen from expression (16), by repeatedly effecting image conversion to one-half of the number of pixels, the interpolated value $Z_p$ to be obtained widely reflects the peripheral pixel values, thereby resulting in improvement of image quality.

Moreover, when the set number of pixels is a value other than $1/2^n$ (n is an integer), the intermediate image having a number of pixels close to the set number of pixels is finally converted by cubic spline interpolation calculation into an image having the set number of pixels.

Namely, the original image data is not converted to the set number of pixels at a single time, but rather, image conversion to one-half of the number of pixels is repeatedly carried out, and then interpolation calculation is carried out on interpolated data of a number of pixels close to the set number of pixels. Accordingly, the image quality of image data finally obtained can be improved.

Next, operation of the present embodiment will be described with reference to the flow chart shown in FIG. 3.

In step 200, an original image is read in the image input section 12 and the read image data is outputted to the image memory 46 of the image conversion section 14.

In step 202, a set value of the number of pixels is inputted by the keyboard 48K to the input portion 48 of the image conversion section 14, and the process proceeds to step 204. As the set value, an enlargement/reduction ratio, or a size of an original image and an image size after image conversion may be inputted.

In step 204, a calculation condition is set by the control portion 50 with the number of pixels (height ($H_0$), width ($W_0$)) of the original image being such that $W=W_0$ and $H=H_0$. In the subsequent step 206, a determination as to whether the number of pixels is such that $W/2<W_x$, or $H/2<H_x$ is made. When the determination of step 206 is negative, the process proceeds to step 208.

In step 208, the cubic spline interpolation calculation which allows image conversion to one-half of the number of pixels is carried out in the interpolation processing portion 52 by the control of the control portion 50. In the subsequent step 210, in the control portion 50, the calculation condition is changed to $W=W/2$ and $H=H/2$, and the determination of step 206 is made again. In steps 206 to 210, the cubic spline interpolation calculation to one-half of the number of pixels is carried out in the interpolation processing portion 52 by the control of the control portion 50 until the determination in step 206 becomes affirmative. Namely, the image conversion to one-half of the number of pixels is repeated until an intermediate image having a number of pixels close to the set number of pixels is obtained.

When the determination in step 206 is affirmative, the process proceeds to step 212. In step 212, the cubic spline interpolation calculation is carried out for the intermediate image, which has been obtained by the aforementioned steps, in the interpolation processing portion 52 by the control of the control portion 50, so as to finally obtain an image having the set number of pixels. Thereafter, the process proceeds to step 214. The cubic spline interpolation calculation carried out herein is carried out to reduce the number of pixels.

In step 214, interpolated image data converted to the set number of pixels is outputted to the image processing portion 58. In step 216, various image processings (color gradation processing, hypertone processing, hypersharpness processing, and the like) are carried out on the interpolated image data outputted to the image processing portion 58, and the processed image data is outputted, as recording image data, to the image memory 60 of the laser printer section 16. The recording image data outputted to the image memory 60 of the laser printer section 16 is used for recording of an image onto the photographic printing paper 70 by the laser driver 62, the laser light sources 64, the polygon mirror 66, and the fθ lens 68 of the laser printer section 16. The photographic printing paper 70 on which an image is recorded in the processor section 18 is subjected to various processings including color development, bleach-fixing, washing, and drying. As a result, an image is formed on the photographic printing paper 70.

Although in step 208, cubic spline interpolation calculation of one-half of the number of pixels is carried out, the cubic spline interpolation calculation of one-half of the number of pixels carried out in step 208 may be replaced by a different interpolation method such as interpolation calculation using a filter. The interpolation calculation using a filter is, for example, provided to obtain an interpolated value as described below.

When pixel values of an original image are indicated as $\ldots Z_k, Z_{k+1}, Z_{k+2}, \ldots$, and pixel values at interpolated points when the pixel values are reduced to one-half of the number of pixels are $\ldots Z_{pk-1}, Z_{pk}, Z_{pk+1}$, the pixel values at the interpolated points can be obtained as described below.

$$Z_{pk}=-0.054Z_k+0.143Z_{k+1}+0.411Z^{k+2}+0.411Z_{k+3}+0.143Z_{k+4}-0.054Z_{k+5}$$

$$Z_{pk+1}=-0.054Z_{k+2}+0.143Z_{k+3}+0.411Z_{k+4}+0.411Z_{k+5}+0.143Z_{k+6}-0.054Z_{k+7}$$

The coefficients in the above expressions are fixed ones due to the conversion rate of the image being fixed, and it is not necessary to obtain an interpolation curve. As a result, high-speed processing can be achieved. In this case, one-dimensional processing is supposed. However, there may be applied a method in which a one-dimensional filter is used at two stages (first, in a direction of the x-axis, and then, in a direction of the y-axis), or a method using a 6×6 size two-dimensional filter or the like to which a one-dimensional filter has been extended. Further, there has only been described herein an embodiment in the case of a two dimensional static image, but the present invention is not limited to the same. Reduction of an image for a dynamic image or a three dimensional image (voxel) can also be realized. Moreover, in a dynamic image, not only the size thereof but also the processing time therefor can similarly be reduced by interpolation.

Figure 3:
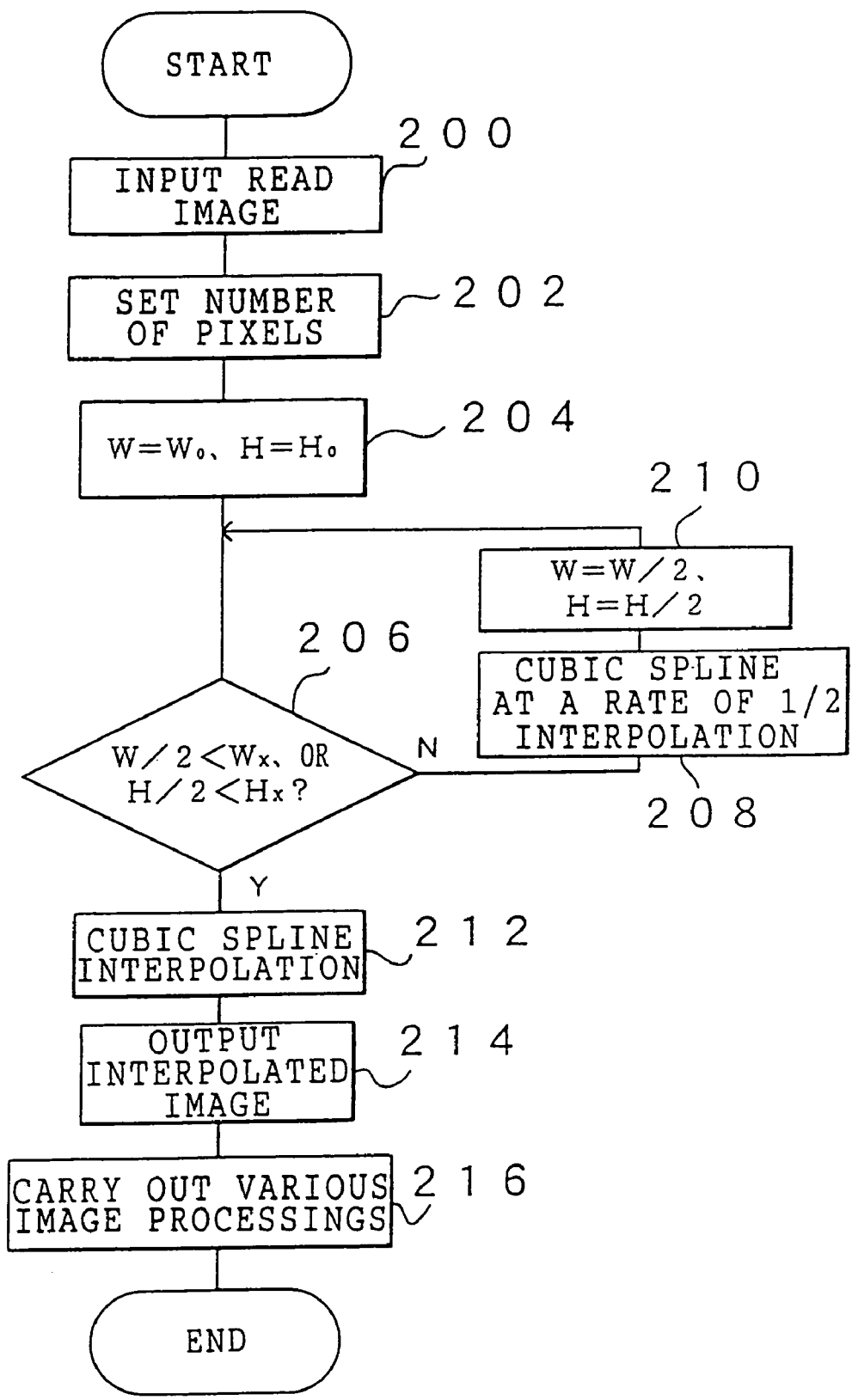
FIG. 3 is a flow chart which shows an example of the flow of a processing executed in an image conversion section of the digital laboratory system according to the embodiment of the present invention.
Figure 4:
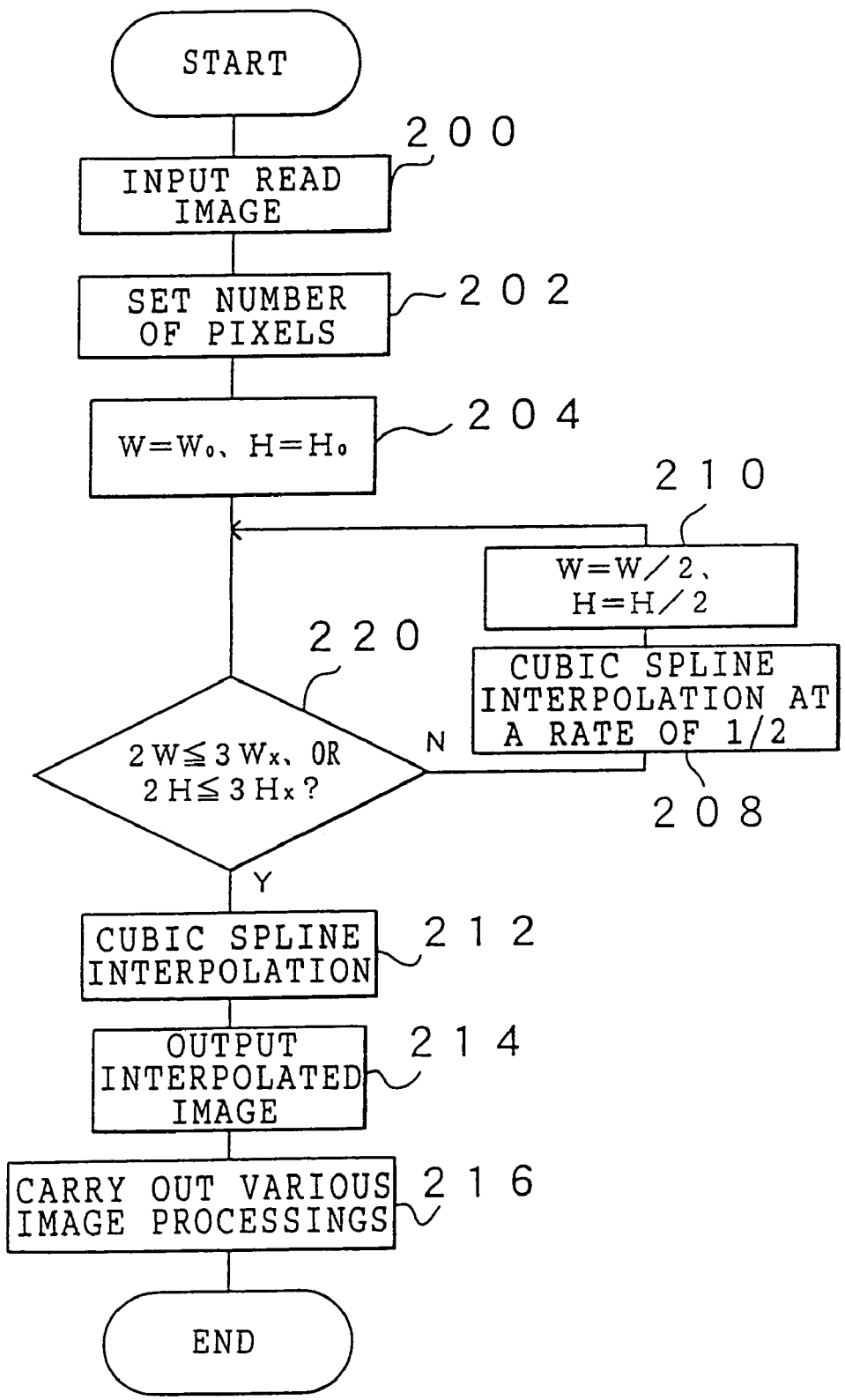
FIG. 4 is a flow chart which shows another example of the flow of a processing executed in the image conversion section of the digital laboratory system according to the embodiment of the present invention.

Further, the processing carried out in the image conversion section 14 can be that of the flow chart shown in FIG. 4. The flow chart of FIG. 4 is different from that of FIG. 3 with respect to the conditions under which the intermediate images obtained by repeatedly carrying out image conversion to one-half of the number of pixels are prepared (that is, the conditions of the determination of step 206 in FIG. 3 are different), and description of steps which are the same will be omitted.

The intermediate image obtained in the flow chart of FIG. 3 is an image having a number of pixels greater than the set number of pixels, but in the intermediate image obtained in the flow chart of FIG. 4, conditions for obtaining an intermediate image having a number of pixels more close to the set number of pixels are set in step 220.

By setting the set conditions so that, for example, an absolute value obtained by subtracting the set number of pixels from the number of pixels of the intermediate image is less than one-half of the set number of pixels (that is, $|W-W_x| \leq W_x/2$, $W \geq W_x/2$, $|H-H_x| H_x/2$, $H \geq H_x/2$), an intermediate image having a number of pixels more close to the set number of pixels is obtained. Namely, by setting, from solutions of the aforementioned expressions, the conditions of the determination of step 220 to "$2W \leq 3W_x$, or $2H \leq 3H_x$?", an intermediate image in which the number of pixels is more close to the set number of pixels can be obtained. Accordingly, the cubic spline interpolation calculation carried out in step 212 allows an image to be finally converted to that having the set number of pixels by increasing or decreasing the number of pixels.

Figure 5:
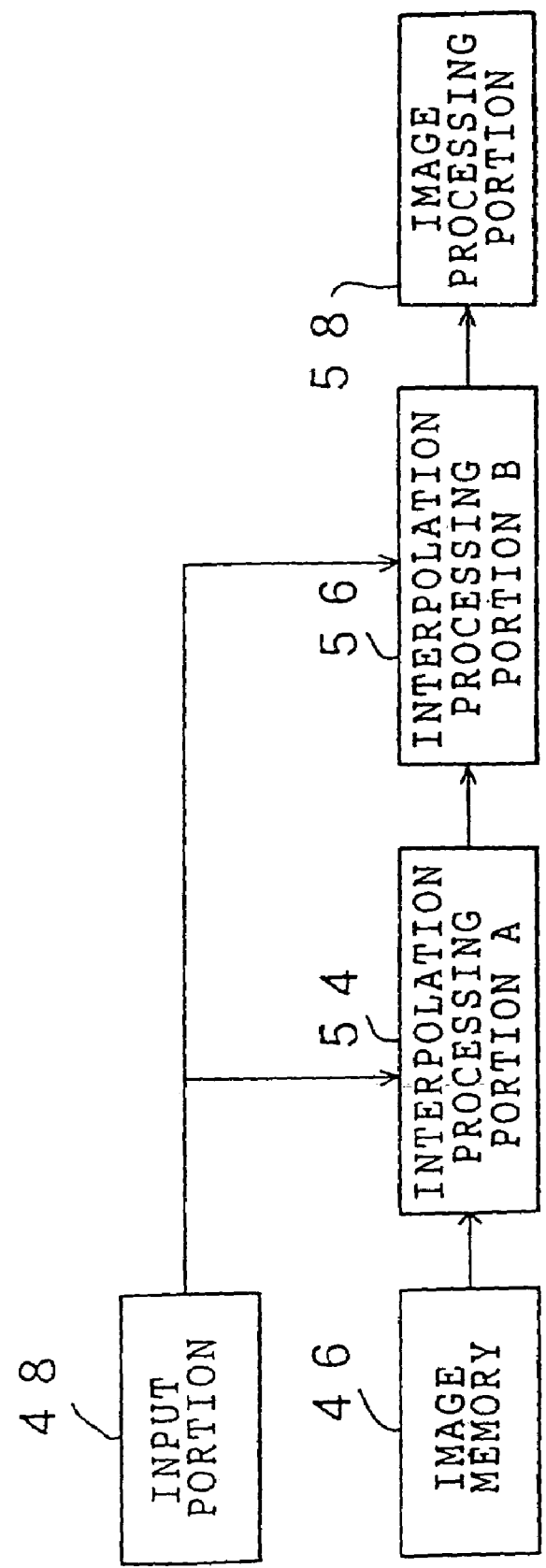
FIG. 5 is a block diagram which shows an example of the structure of the image conversion section.

In the first embodiment, there is described a structure in which the image conversion to one-half of the number of pixels is repeatedly carried out in the interpolation processing portion 52 by the control of the control portion 50, an intermediate-image having a number of pixels close to the set number of pixels is thereby generated, and further, the generated intermediate image is finally converted to the set number of pixels by carrying out the cubic spline interpolation calculation on the intermediate image. However, as shown in FIG. 5, a structure may be provided such that the control portion 50 and the interpolation processing portion 52 may be replaced with an interpolation processing portion A 54 and an interpolation processing portion B 56. In this case, in the interpolation processing portion A 54, the number of times of repetition of image conversion to one-half of the number of pixels is determined in accordance with the set value inputted to the input portion 48, and in accordance with the determined number of times, the image conversion to one-half of the number of pixels is carried out so as to generate an intermediate image having a number of pixels close to the set number of pixels. In the interpolation processing portion A 56, interpolation calculation for converting the intermediate image generated by the interpolation processing portion A 54 to an image having the set number of pixels is carried out. Further, the interpolation calculation carried out in the interpolation processing portion A 54 and the interpolation processing portion B 56 is not limited to cubic spline interpolation calculation, and linear interpolation or Lagrange interpolation may also be applied.

The present embodiment is constructed in such a manner that first image conversion to one-half of the number of pixels is repeatedly carried out, and an image having the set number of pixels is finally obtained by carrying out second image conversion which converts the final intermediate image, which has a number of pixels close to the set number of pixels, to an image which has a number of pixels equal to the set number of pixels. However, the second image conversion may be carried out prior to the first image conversion, or may be carried out during repetition of the first image conversion.

Figure 6A:
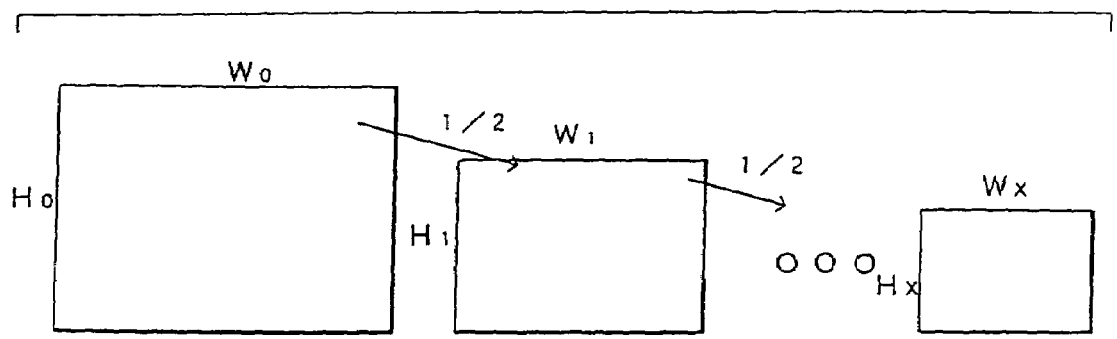
FIGS. 6A and 6B are diagrams which each show preparation of an intermediate image in the embodiment of the present invention.
Figure 6B:
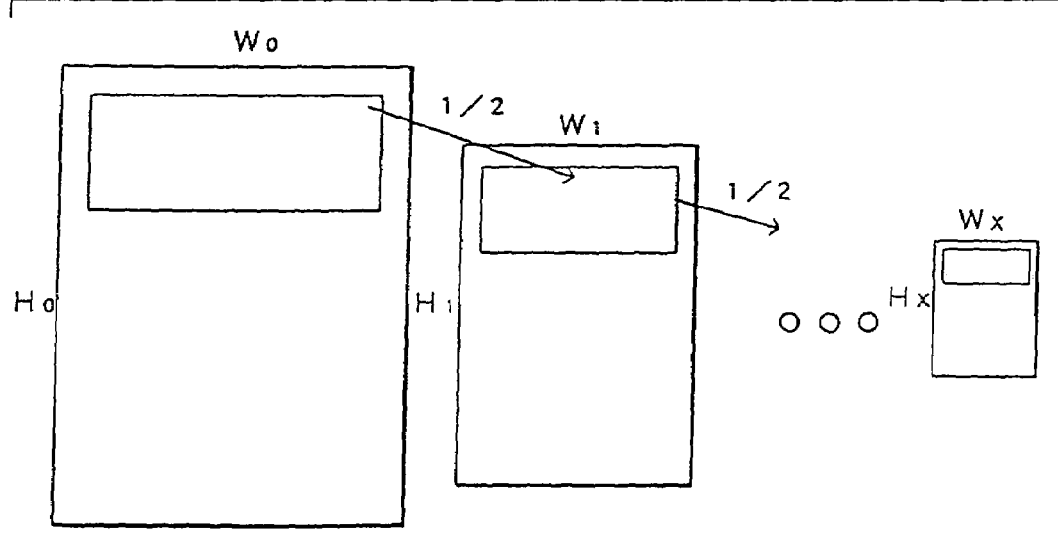

Further, in the first embodiment, when an intermediate image is prepared by repeatedly carrying out the image conversion to one-half of the number of pixels, as shown in FIG. 6A, the intermediate image is prepared by repeatedly carrying out image conversion for an entire original image. However, as shown in FIG. 6B, an intermediate image may be prepared in such a manner that the image conversion to one-half of the number of pixels is repeatedly carried out for a partial image, and then image conversion is repeatedly carried out for the next partial image. Moreover, by preparing the intermediate image in this way, it is possible to decrease the amount of memory used when an intermediate image is generated and calculated.

In the present first embodiment, there is described a structure in which image conversion is carried out mainly by cubic spline interpolation calculation, but other interpolation methods (for example, linear interpolation, Lagrange interpolation, and the like) may also be applied.

Second Embodiment

A digital laboratory system in a second embodiment of the present invention is different from that of the first embodiment with respect to the processings of the control portion 50 and the interpolation processing portion 52 in the image conversion section 14. Other structures are the same as those of the first embodiment and description thereof will be omitted.

In the second embodiment, the control portion 50 controls the interpolation processing portion 52 in accordance with a set value of the number of pixels after image conversion, which is inputted via the keyboard 48K of the input portion 48, so as to effect control for conversion of a frame image recorded on the photographic film 100 to an image having the set number of pixels by carrying out image conversion in plural stages.

The interpolation processing portion 52 is structured to carry out image conversion in plural stages by the control of the control portion 50. The image conversion in plural stages is carried out in such a manner as described below. For example, when a conversion rate set in the input portion 48 is 2/9, the conversion rate 2/9 is divided into three, i.e., (29/45)×(17/29)×(10/17), and image conversion to an image having the set number of pixels is realized by effecting conversion three times, that is, cubic spline conversion at a rate of 29/45, cubic spline conversion at a rate of 17/29, and cubic spline conversion at a rate of 10/17. In the image conversion in plural stages, when a filter used for reduction of an image is an N×N size filter and an image is reduced to be less than 1/N, reduction (image conversion) of 1/N or greater is effected. In the aforementioned case, conversion at a rate of 1/4 or greater is effected using a 4×4 size filter.

Next, operation of the second embodiment will be described in comparison with the first embodiment, by an example of a case of image conversion at the rate of 2/9.

When image conversion at, for example, the rate of 2/9 is carried out by using conventional cubic spline interpolation, four coefficients $c_{k-1}$ to $c_{k+2}$ are used as interpolation coefficients. For this reason, a pixel value of reduction conversion (image conversion) is determined by using a 4×4 size filter. This state is shown in FIG. 7. FIG. 7 is shown in a one dimensional manner for simplification.

Filters used at this time are determined by substituting t=0 in the case of a filter A and T=0.5 in the case of a filter B in the following expressions, and are listed in Table 1.

$c_{k-1}(t)=(-t^3+2t^2-t)/2$ $c_k(t)=(3t^3-5t^2+2)/2$ $c_{k+1}(t)=(-3t^3+4t^2+t)/2$ $c_{k+2}(t)=(t^3-t^2)/2$

TABLE 1

|  | Filter A | Filter B |
| --- | --- | --- |
| $C_{k-1}(t)$ | 0 | -1/16 |
| $C_k(t)$ | 1 | 9/16 |
| $C_{k+1}(t)$ | 0 | 9/16 |
| $C_{k+2}(t)$ | 0 | -1/16 |

Accordingly, one of four pixels is used by the filter A and all of four pixels are used by the filter B. Namely, only 5/9 of the pixels of an entire image (in a two-dimensional case, 25/81) are reflected in a converted image. However, in the second embodiment, the image conversion at the rate of 2/9 is carried out in plural stages. For example, image conversion is separated into three stages, that is, 2/9=(29/45)×(17/29)×(10/17), such that cubic spline interpolation at a rate of 29/45, cubic spline interpolation at a rate of 17/29, and cubic spline interpolation at a rate of 10/17 are sequentially carried out.

Since the image conversion is thus effected in plural stages, processing similar to that using a filter whose size is apparently greater than 4×4 can be carried out in the same way as in the first embodiment. Therefore, all of the pixels in an original image can be reflected. For example, assuming that 12 pixels of an original image (in a two-dimensional case, 122 pixels) correspond to one pixel of a converted image by carrying out image conversion three times as described above, image conversion using a filter which is apparently 12×12 size can be carried out.

Generally, when image conversion is carried out by using an N×N size filter, multiplication must be carried out $N^2$ times for calculation of one pixel. For this reason, when the number of times multiplication is carried out when image conversion is carried out three times by using a 4×4 size filter and the number of times multiplication is carried out when image conversion is carried out by using a 12×12 size filter are compared with each other, the number of times multiplication must be carried out when the size of an original image is m pixels by n pixels is as shown in FIGS. 8A and 8B.

As shown in FIG. 8A, when a 12×12 size filter is used, the number of times multiplication is carried out is $12^2$ mn=144 times (mn: m is a number of pixels of the image along one axis; and n is a number of pixels of the image along the other axis). As shown in FIG. 8B, when image conversion is carried out in three stages by using a 4×4 size filter, the number of times multiplication is carried out is as follows.

$$\{4^2+4^2(29/45)^2+4^2(17/45)^2\}mn=25 \text{ mn times}$$

In this case, when a 4×4 size filter is used three times, the calculation time is reduced to 17% as compared with a case of using a 12×12 size filter, and a reduction in the calculation time can be realized.

When the image conversion is carried out in plural stages as described above, a larger number of original pixels is reflected in an one pixel in the latter image conversion as compared with the case of the former image conversion. Accordingly, it is preferable that the image conversion rate of the latter image conversion is made closer to 1 as compared with the former image conversion, so as to prevent deterioration in the image quality which is caused by the latter image conversion. For example, when image conversion at the rate of p0, p2, . . . pn is sequentially carried out, the conversion rate is divided so as to form the relation of p0<p1< . . . <pn<1.

Further, image conversion at a rate of 1/a means interpolation with an interpolated point being determined for each of a pixels of an original image. When image conversion is carried out by using an N×N size filter, unless image conversion at a rate of at least 1/N is carried out, pixels which are not reflected by the pixels obtained after image conversion may exist. Accordingly, when image conversion is carried out in plural stages, it is preferable that only various image conversions at rates of 1/N or greater are combined together.

Third Embodiment

A digital laboratory system of the third embodiment is different from those of the first and second embodiments with respect to the structure of the image conversion section 14. The structures of other parts are the same as those of the first and second embodiments, and thus, description thereof will be omitted.

The image conversion section 14 of the third embodiment is, as shown in FIG. 9, formed by an input portion 48 having the keyboard 48K used to input a set value of the number of pixels, a first interpolation processing portion 76 which carries out image conversion by using linear interpolation, a second interpolation processing portion 78 which carries out image conversion by using cubic spline interpolation, a control portion 74 which controls the first interpolation processing portion 76 and the second interpolation processing portion 78, an image memory 46, and an image processing portion 58.

The first interpolation processing portion 76 carries out image conversion at the rate of 1/2 by linear interpolation. The linear interpolation allows connection of original image data $\{Z_k\}$, obtained by reading an original image, by using a linear function $\{f_k\}$ for each section, and thereby makes the value of $f_k$, at a position where an interpolated point is set, into interpolated image data. Assuming that image data of continuous pixels $X_k$ and $X_{k+1}$ of an original image are indicated as $Z_k$ and $Z_{k+1}$, respectively, and a linear function set in the section $X_k X_{k+1}$ is indicated as $f_k$, the following expression is given.

$$f_k(X)=(Z_{k+1}-Z_k)(X-X_k)/(X_{k+1}-X_k)+Z_k \quad (17)$$

When the section is standardized ($t=(X-X_k)/(X_{k+1}-X_k)$) to become a section 0 to 1, the expression (17) is modified into the following expression (18):

$$f_k(t)=(Z_{k+1}-Z_k)t+Z_k=(1-t)Z_k+tZ_{k+1} \quad (18)$$

Accordingly, interpolation coefficients $c_k(t)$ and $c_{k+1}(t)$ corresponding to original image data $Z_k$ and $Z_{k+1}$ are as follows from the expression (18).

$$c_k(t)=1-t$$

$$c_{k+1}(t)=t$$

In the image conversion at the rate of 1/2 using the linear interpolation, when interpolation is effected in the state that the positions of the pixels after interpolation will correspond to the positions of the pixels of the original image, the image conversion becomes simple sampling for one-half of the number of pixels and the image quality thereby deteriorates. For this reason, the linear interpolation of the present embodiment is effected in the state that the positions of the pixels after interpolation will be displaced by an amount of one-half of a pixel from the positions of the pixels of the original image. At this time, a filter in which the interpolation coefficients are set such that $c_k(t)=c_{k+1}(t)=0.5$ with $t=0.5$ substituted therein may be used.

Further, the second interpolation processing portion 78 carries out image conversion by the cubic spline interpolation described in the first embodiment with an amount of half a pixel being displaced, and by ordinary cubic spline interpolation at an arbitrary rate.

Next, operation of the third embodiment will be described in a case of image conversion at the rate of 1/20.

When an image conversion rate of 1/20 is set in the input portion 48, the rates of the image conversion carried out by the first interpolation processing portion 76 and the second interpolation processing portion 78 are determined by the control portion 74. For example, the control portion 74 effects control such that, for example, the first interpolation processing portion 76 effects linear interpolation at the rate of 1/2 twice and the second interpolation processing portion 78 effects cubic spline interpolation, with an amount of half a pixel displaced, at the rate of 1/2 twice and cubic spline interpolation at the rate of 4/5.

Image data temporarily stored in the image memory 46 is outputted to the first interpolation processing portion 76, and linear interpolation at the rate of 1/2 is carried out as described above in the first interpolation processing portion 76. The image data converted to 1/4 is outputted to the second interpolation processing portion 78, and the cubic spline interpolation with an amount of half a pixel displaced and the cubic spline interpolation at an arbitrary rate are carried out by the second interpolation processing portion 78. The image data finally converted to 1/20 is outputted to the image processing portion 58.

As described in the second embodiment, in the case of image conversion in plural stages, the later image conversion exerts a great influence on the image quality as compared with the earlier image conversion. Namely, in the third embodiment, since an image conversion with importance set on processing speed is carried out by the first interpolation processing portion 76 and an image conversion with importance set on image quality is carried out by the second interpolation processing portion 78, image conversion with both the processing speed and the image quality being improved can be realized.

The interpolation processings carried out by the first interpolation processing portion 76 and the second interpolation processing portion 78 are not limited to linear interpolation and cubic spline interpolation, as long as interpolation processings with importance being respectively set on the processing speed and the image quality are used. Further, two kinds of interpolation processings are carried out in the first interpolation processing portion 76 and the second interpolation processing portion 78, but three or more kinds of interpolation processings which are different with respect to processing speed and image quality may be sequentially carried out, or interpolation processing may be combined with an interpolation in which image conversion at the rate of 1/2 is repeatedly effected in the same way as in the first embodiment.

In each of the above-described embodiments, a description was given, as an example, of a digital laboratory system in which a photographic film is read and interpolation processing is carried out, but the present invention is not limited to the same. The present invention can also be applied to a system in which interpolation processing is carried out when image conversion such as enlargement or reduction is effected by using, as an original, a recording material (a reflection original or the like) such as a photographic printing paper, a regular paper, or a heat-sensitive paper, and by reading an image recorded on the recording material (for example, a system such as a copying machine or the like).

Moreover, it is also possible to record the interpolation processing carried out in the above-described embodiments (that is, the processings carried out in the flow charts shown in FIGS. 3 and 4) as a program on a recording medium such as a floppy disk or a hard disk, read the program by a computer, and carry out the interpolation processing.

What is claimed is:

1. An image conversion method in which image data represented by a required number of pixels is obtained from original image data represented by a predetermined number of pixels, comprising the steps of:
    carrying out a first, initial image conversion, without previously enlarging which controls said original image data to said predetermined number of pixels, by obtaining, by a first interpolation calculation, image data represented by a number of pixels which is one-half of the predetermined number of pixels, from the original image data represented by the predetermined number of pixels;
    preparing an intermediate image by repeatedly carrying out the first, initial image conversion at a rate of one-half of the number of pixels, until a number of pixels close to the required number is reached; and
    carrying out a second image conversion by obtaining, from the intermediate image, image data represented by the required number of pixels.

2. An image conversion method in which image data represented by a required number of pixels is obtained from original image data represented by a predetermined number of pixels, comprising the steps of:
    carrying out a first image conversion by obtaining, by a first interpolation calculation, image data represented by a number of pixels which is one-half of the predetermined number of pixels, from the original image data represented by the predetermined number of pixels;
    preparing an intermediate image by repeatedly carrying out the first image conversion at a rate of one-half of the number of pixels, until a number of pixels close to the required number is reached; and
    carrying out a second image conversion by obtaining, from the intermediate image, image data represented by the required number of pixels;
    wherein the first interpolation calculation, which is carried out when the first image conversion for preparing the intermediate image is effected, is different from a second interpolation calculation, which is carried out when the image conversion for obtaining the image data represented by the required number of pixels from the intermediate image is effected.

3. An image conversion method according to claim 1, wherein the intermediate image has a number of pixels which is greater than and closest to the required number of pixels.

4. An image conversion method in which image data represented by a required number of pixels is obtained from original image data represented by a predetermined number of pixels, comprising the steps of:
    carrying out a first image conversion by obtaining, by a first interpolation calculation, image data represented by a number of pixels which is one-half of the predetermined number of pixels, from the original image data represented by the predetermined number of pixels;
    preparing an intermediate image by repeatedly carrying out the first image conversion at a rate of one-half of the number of pixels, until a number of pixels close to the required number is reached; and
    carrying out a second image conversion by obtaining, from the intermediate image, image data represented by the required number of pixels;
    wherein the intermediate image is prepared by dividing the original image data into partial images and repeatedly carrying out the first image conversion to one-half of the number of pixels for each of the partial images.

5. An image conversion method in which image data represented by a required number of pixels is obtained from original image data represented by a predetermined number of pixels, comprising the steps of:
    carrying out a first image conversion by obtaining, by a first interpolation calculation, image data represented by a number of pixels which is one-half of the predetermined number of pixels, from the original image data represented by the predetermined number of pixels;
    preparing an intermediate image by repeatedly carrying out the first image conversion at a rate of one-half of the number of pixels, until a number of pixels close to the required number is reached; and carrying out a second image conversion by obtaining, from the intermediate image, image data represented by the required number of pixels;

wherein the first and second interpolation calculations are carried out by using at least two types of interpolation calculation methods.

6. An image conversion method in which image data represented by a required number of pixels is obtained from original image data represented by a predetermined number of pixels by repeatedly carrying out a first interpolation calculation at a rate of one-half of the number of pixels, wherein image data represented by the required number of pixels is obtained by carrying out a second interpolation calculation at a rate of x (wherein 1>x>1/2) of a number of pixels at one of a beginning step, an intermediate step, and a final step of image conversion.

7. An image conversion method in which image data represented by a required number of pixels is obtained from original image data represented by a predetermined number of pixels, comprising the steps of:

obtaining by interpolation calculation, from the original image data represented by the predetermined number of pixels, image data represented by a number of pixels of 1/N (wherein N is an integer of 2 or more) or greater, by using an N-size filter used to obtain an interpolated point from N pixels, thereby allowing image conversion; and obtaining image data represented by the required number of pixels by carrying out the interpolation calculation in plural stages.

8. An image conversion method according to claim 7, wherein the required number of pixels is 1/N (wherein N is an integer of 2 or more) or less.

9. An image conversion method according to claim 7, wherein the interpolation calculations carried out in plural stages are effected in order from that of the lowest conversion rate.

10. An image conversion method according to claim 7, wherein the interpolation calculation is carried out by using at least two types of interpolation calculation methods.

11. An image conversion apparatus comprising:

setting means for setting a number of pixels after a first and a second image conversion of original image data represented by a predetermined number of pixels;

interpolation calculation means which effects the second image conversion by obtaining, by interpolation calculation, image data represented by pixels of the number set by said setting means; and control means which controls said interpolation calculation means such that said interpolation calculation means converts the original image data into an intermediate image having a number of pixels close to the number of pixels set by said setting means by repeatedly effecting the first image conversion to one-half and such that said interpolation calculation means carries out the second image conversion to further make the intermediate image into the set number of pixels.

12. An image conversion apparatus comprising:

setting means for setting a number of pixels after a first and a second image conversion of original image data represented by a predetermined number of pixels;

first interpolation calculation means which effects image conversion by obtaining, by interpolation calculation a first and from the original image data represented by the predetermined number of pixels, image data represented by pixels of a number which is one-half of the predetermined number of pixels, and prepares an intermediate image by repeatedly effecting the first image conversion at a rate of one-half until a number of pixels close to the required number of pixels is reached; and second interpolation calculation means which effects a second interpolation calculation such that the intermediate image is further made into image data represented by pixels of the number set by said setting means.

13. An image conversion apparatus comprising:

setting means for setting a number of pixels after image conversion of original image data represented by a predetermined number of pixels;

interpolation calculation means which effects interpolation calculation at a rate of 1/N (wherein N is an integer of 2 or more) or greater by using an N-size filter used for obtaining an interpolated point from N pixels; and control means which controls said interpolation calculation means so that image data represented by pixels of the number set by said setting means is obtained by effecting the interpolation calculation in plural stages.

14. An image conversion processing program which allows image conversion processing, for converting original image data represented by a predetermined number of pixels to image data representing an image by a set number of pixels, to be executed by a computer, comprising:

a first step in which a first, initial image conversion, without previously enlarging which controls said original image data to said predetermined number of pixels, is effected by obtaining, by interpolation calculation, image data represented by pixels of a number which is one-half of the predetermined number of pixels from the original image data represented by the predetermined number of pixels, and an intermediate image is prepared by repeatedly effecting the first, initial image conversion to one-half until a number of pixels close to a required number of pixels is reached; and a second step in which a second image conversion is effected by obtaining image data represented by a required number of pixels from the intermediate image prepared in said first, initial step.

15. An image conversion processing program which allows image conversion processing, for converting original image data represented by a predetermined number of pixels to image data representing an image by a set number of pixels, to be executed by a computer, comprising:

a first step in which image data, which is represented by a number of pixels which is reduced to 1/N (wherein N is an integer of 2 or more) of the predetermined number of pixels, is obtained by interpolation calculation from original image data represented by the predetermined number of pixels, by using an N-size filter used for obtaining an interpolated point from N pixels; and a second step in which image data represented by a required number of pixels is obtained by carrying out said first step in plural stages.

16. A recording medium on which the image conversion processing program according to claim 14 is recorded.

17. A recording medium on which the image conversion processing program according to claim 15 is recorded.

18. An image conversion method in which image data represented by a required number of pixels is obtained from original image data represented by a predetermined number of pixels, comprising the steps of:

repeatedly carrying out a first, initial image conversion, without previously enlarging which controls said original image data to said predetermined number of pixels, which obtains, by interpolation calculation and from initial image data, subsequent image data represented by a number of pixels which is one-half of the number of pixels of the initial image data, said first, initial image conversion being repeatedly carried out from the original image data until the number of pixels of image data obtained by the first, initial image conversion is near the required number of pixels; and obtaining, from image data of the number of pixels near the required number of pixels, image data represented by the required number of pixels.

19. An image conversion method in which image data represented by a required number of pixels is obtained from original image data represented by a predetermined number of pixels, comprising the steps of:

carrying out a first image conversion by obtaining, by a first interpolation calculation, image data represented by a number of pixels which is one-half of the predetermined number of pixels, from the original image data represented by the predetermined number of pixels;

preparing an intermediate image by repeatedly carrying out the first image conversion at a rate of one-half of the number of pixels, until a number of pixels close to the required number is reached; and carrying out a second image conversion by obtaining, from the intermediate image, image data represented by the required number of pixels;

wherein said step of carrying out conversion by obtaining, from the intermediate image, image data represented by the required number of pixels performs conversion at a rate of x (wherein 1>x>1/2).

20. The image conversion apparatus according to claim 11, wherein said second image conversion to further make the intermediate image into the set number of pixels performs conversion at a rate of x (wherein 1>x>1/2).

21. An image conversion method in which image data represented by a required number of pixels is obtained from original image data represented by a predetermined number of pixels, comprising the steps of:

carrying out a first image conversion by obtaining, by a first interpolation calculation, image data represented by a number of pixels which is one-half of the predetermined number of pixels, from the original image data represented by the predetermined number of pixels;

preparing an intermediate image by repeatedly carrying out the first image conversion at a rate of one-half of the number of pixels, until a number of pixels close to the required number is reached; and carrying out a second image conversion by obtaining, from the intermediate image, image data represented by the required number of pixels;

wherein the first and second interpolation calculations are carried out by using at least two types of interpolation calculation methods;

wherein the first interpolation calculation performs high-speed conversion and the second interpolation calculation, which is performed subsequent to said first interpolation calculation, is for preserving image quality.

22. The image conversion method according to claim 10, wherein a first type of interpolation performs high-speed conversion and a second type of interpolation, which is performed subsequent to said first type, is for preserving image quality.

* * * * *